United States Patent
Zhang

(10) Patent No.: US 9,232,575 B2
(45) Date of Patent: Jan. 5, 2016

(54) LCD BACKLIGHT DRIVING CIRCUIT AND LIQUID CRYSTAL DEVICE

(71) Applicant: Shenzhen China Star Optoelectronics Technology Co., Ltd., Shenzhen, Guangdong (CN)

(72) Inventor: Xianming Zhang, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 115 days.

(21) Appl. No.: 14/233,150

(22) PCT Filed: Nov. 29, 2013

(86) PCT No.: PCT/CN2013/088165
§ 371 (c)(1),
(2) Date: Jan. 15, 2014

(87) PCT Pub. No.: WO2015/074288
PCT Pub. Date: May 28, 2015

(65) Prior Publication Data
US 2015/0145424 A1 May 28, 2015

(30) Foreign Application Priority Data
Nov. 25, 2013 (CN) .......................... 2013 1 0604035

(51) Int. Cl.
*H05B 33/08* (2006.01)
*H05B 41/28* (2006.01)
*G02F 1/1335* (2006.01)
*G09G 3/34* (2006.01)

(52) U.S. Cl.
CPC ...... *H05B 33/0803* (2013.01); *G02F 1/133603* (2013.01); *G02F 2001/133612* (2013.01); *G09G 3/3406* (2013.01)

(58) Field of Classification Search
None
See application file for complete search history.

(56) References Cited

U.S. PATENT DOCUMENTS

2009/0295776 A1* 12/2009 Yu et al. .................... 345/212
2011/0227497 A1* 9/2011 Hu et al. .................... 315/224

FOREIGN PATENT DOCUMENTS

CN 101426312 A 5/2009

* cited by examiner

*Primary Examiner* — Douglas W Owens
*Assistant Examiner* — Dedei K Hammond
(74) *Attorney, Agent, or Firm* — Andrew C. Cheng

(57) ABSTRACT

A LED backlight driving circuit is disclosed. The LED backlight driving circuit includes a driving module, a detecting module, and an adjusting module. The driving module receives a control voltage generated by a voltage control module, receives a feedback voltage generated by a feedback voltage module, and generates driving signals to a LED unit. The detecting module generates adjusting signals for the adjusting module according to a detected value of the driving signals. The adjusting module controls the feedback voltage according to the adjusting signals generated by the detecting module so as to adjust the driving signals. In this way, not only the current precision within the LED unit is enhanced, but also the light source is kept stable. Also, the life cycle of the LED units is also increased. In addition, a LED backlight driving circuit includes the above LED backlight driving circuit is also disclosed.

12 Claims, 4 Drawing Sheets

LCD BACKLIGHT DRIVING CIRCUIT AND LIQUID CRYSTAL DEVICE

BACKGROUND OF THE INVENTION

1. Field of the Invention

The present disclosure relates to LED backlight driving circuit technology, and more particularly to a LED backlight driving circuit capable of precisely adjusting the current of LED units, and the liquid crystal device with the same.

2. Discussion of the Related Art

With the technical evolution, the backlight technology for the LCDs has been developed. In the past, CCFLs are adopted as backlight sources. However, LEDs have now been adopted as backlight sources for the reason that the CCFLs have the disadvantages, such as low color restoration, low lighting efficiency, high discharging voltage, bad discharging characteristics at low temperature, and long heating time to achieve stable gray level. Generally, the LED backlight source is arranged opposite to the liquid crystal panel so as to provide the light source to the liquid crystal panel. The LED backlight source includes at least one LED string having a plurality of serially connected LEDs.

FIG. 1 is a schematic view of a typical driving circuit of LED backlight source for liquid crystal devices. As shown, the LED backlight driving circuit includes a driving module 1 for providing a driving voltage to a LED unit 2. The driving module 1 receives a control voltage received from a voltage control module 3 for controlling the driving voltage. At the same time, a feedback voltage module 4 is provided between the LED unit 2 and the ground. The feedback voltage module 4 generates a feedback voltage to the driving module 1. The driving module 1 monitors a current amount of the LED unit 2 by monitoring the value of the feedback voltage. The driving module 1 is capable of adjusting the value of the driving voltage according to the value of the feedback voltage so as to change the value of the driving voltage. In order to obtain stable light source in the LED backlight driving circuit, the driving current has to be precise enough. As stated, referring to circuit shown in FIG. 1, the driving current is configured according to the control voltage of the voltage control module 3 and the feedback voltage of the feedback voltage module 4. FIG. 2 is a circuit diagram of the voltage control module 3. The control voltage (Vd) is obtained by diving the voltage (Vcc) by resistance voltage dividers (Rc1, Rc2). The deviation of the resistance voltage dividers (Rc1, Rc2) may affect the control voltage (Vd), and so as the precision of the driving current. FIG. 3 is a circuit diagram of the feedback voltage module 4. The drain of the first MOS transistor Q1 connects to the negative end of the LED unit 2. The gate (G) of the first MOS transistor Q1 is controlled by the driving module 1. The source of the first MOS transistor Q1 is grounded via a feedback resistor (Rs). The feedback voltage (Vs) obtained from the feedback resistor (Rs) is inputted to the driving module 1. By monitoring the value of the feedback voltage (Vs), the amount of the current of the LED unit 2 is monitored so as to obtain an appropriate current value by adjustment. Within the circuit, the two parameters, i.e., control voltage (Vd) and feedback voltage (Vs), of the driving current are obtained by the resistance voltage dividers. The deviation of the resistance voltage dividers results in the deviation of the control voltage (Vd) and the feedback voltage (Vs). As such, the precision of the driving current is also affected.

SUMMARY

In one aspect, a LED backlight driving circuit includes: a driving module for receiving a control voltage generated by a voltage control module, receiving a feedback voltage generated by a feedback voltage module, and generating driving signals to a LED unit; a detecting module for generating adjusting signals for an adjusting module according to a detected value of the driving signals; and the adjusting module for controlling the feedback voltage according to the adjusting signals generated by the detecting module so as to adjust the driving signals.

Wherein one reference driving signals is configured within the detecting module, the adjusting module increases the feedback voltage according to a first adjusting signals when the detecting module determines that a value of the driving signals is smaller than the reference driving signals, and the adjusting module decreases the feedback voltage according to a second adjusting signals when the detecting module determines that the value of the driving signals (Iled) is larger than the reference driving signals.

Wherein the detecting module includes a precise resistor serially connected between the LED unit and ground, and the value of the driving signals of the circuit is obtained by detecting the driving signals of the precise resistor.

Wherein the detecting module further includes a first amplifier and a first comparator, a negative end of the first amplifier connects to a low potential end of the precise resistor via a second resistor, a first resistor is provided between a negative end and the ground, a positive end of the first amplifier connects to a high potential end of the precise resistor via a third resistor, a fourth resistor is provided between the positive end and an output end of the first amplifier, the output end of the first amplifier connects to a negative end of the first comparator, a positive end of the first comparator connects to the reference driving signals, and the output end of the first comparator outputs the adjusting signals.

Wherein the resistance of the first resistor, the second resistor, the third resistor, and the fourth resistor are the same.

Wherein the adjusting module includes a calculating circuit having two input ends and one output end, one of the input end receives the adjusting signals, and the other input end receives the feedback voltage generated by the feedback voltage module, the output end connects to a feedback voltage node of the feedback voltage module, a relationship between the signals of the output end and the two input ends satisfies the equation: $Vs=A*Vz+Vs0$, wherein Vs represents a voltage value of the output end, which is the feedback voltage value generated by the feedback voltage module, Vz represents the voltage value of one of the input end, which is the voltage value of the adjusting signals, Vs0 represents the voltage value of another input end, which is the feedback voltage value recently generated by the feedback voltage module, and A is a constant number.

Wherein the adjusting module further includes a second amplifier and a third amplifier, the negative end of the second amplifier receives the adjusting signals and the feedback voltage respectively via the fifth resistor, and the sixth resistor, the positive end of the second amplifier is electrically grounded, the output end of the second amplifier connects to the negative end of the third amplifier via the eighth resistor, a seventh resistor is provided between the negative end and the output end of the second amplifier, the positive end of the third amplifier is electrically grounded, the output end of the third amplifier connects to the feedback voltage node of the feedback voltage module, and a ninth resistor is provided between the negative end and the output end of the second amplifier.

Wherein the resistance of the sixth resistor and the seventh resistor are the same, and the resistance of the eighth resistor and the ninth resistor are the same, and the resistance of the fifth resistor is smaller than the resistance of the seventh resistor.

Wherein the driving module includes a boost circuit and a driving IC, the boost circuit converts input voltage signals to the needed driving signals so as to provide the driving signals to the LED unit, the driving IC receives the control voltage and the feedback voltage to control the boost circuit such that the boost circuit is capable of converting the input voltage signals to the needed driving signals for the LED unit.

In another aspect, a liquid crystal device includes a LED backlight source, and the LED backlight source adopts the above LED backlight driving circuit.

In view of the above, the driving module receives the feedback voltage generated by the feedback voltage module to adjust the current within the LED unit. In addition, the current within the LED unit is also precisely adjusted by the detecting module and the adjusting module. Specifically, one reference driving signals is configured within the detecting module. When detecting the current within the LED unit is smaller than the reference driving signals, the first adjusting signals are generated. The adjusting module increases the feedback voltage according to the first adjusting signals so as to increase the current within the LED unit. When detecting the current within the LED unit is larger than the reference driving signals, the second adjusting signals are generated. The adjusting module decreases the feedback voltage according to the second adjusting signals so as to decrease the current within the LED unit. In this way, not only the current precision within the LED unit is enhanced, but also the light source is kept stable. Also, the life cycle of the LED units is also increased.

DETAILED DESCRIPTION OF THE EMBODIMENTS

As stated above, the object of the claimed invention is to provide a LED backlight driving circuit for enhancing the current precision within the LED unit. The LED backlight driving circuit includes a driving module, a detecting module, and an adjusting module. The driving module is for receiving a control voltage generated by a voltage control module, receiving a feedback voltage generated by a feedback voltage module, and generating driving signals to a LED unit. The detecting module is for generating adjusting signals for the adjusting module 6 according to a detected value of the driving signals. The adjusting module is for controlling the feedback voltage according to the adjusting signals generated by the detecting module so as to adjust the driving signals. In this way, not only the current precision within the LED unit is enhanced, but also the light source is kept stable. Also, the life cycle of the LED units is also increased.

Embodiments of the invention will now be described more fully hereinafter with reference to the accompanying drawings, in which embodiments of the invention are shown.

Figure 1:
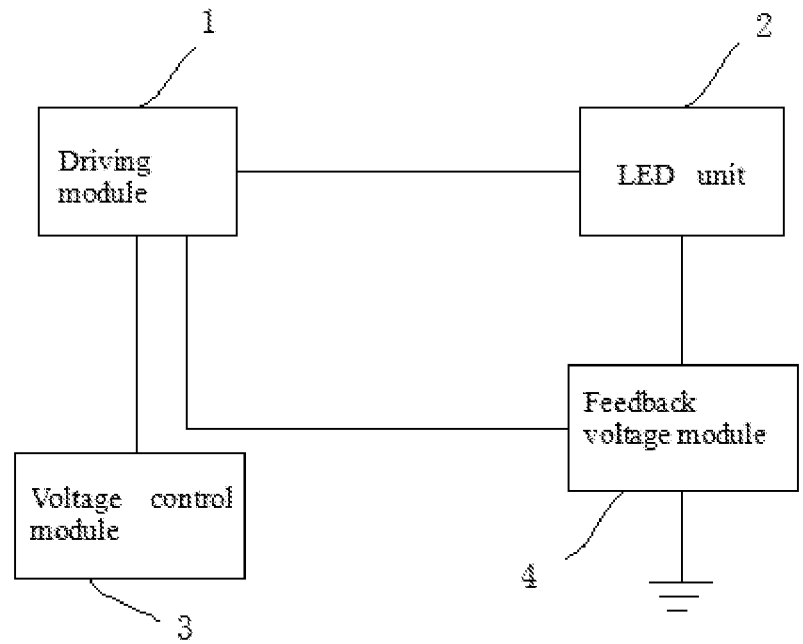
FIG. 1 is a connected module diagram of a typical LED backlight driving circuit.
Figure 2:
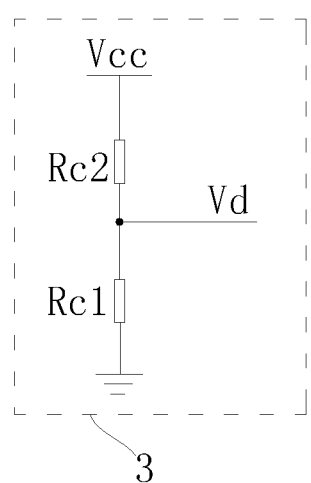
FIG. 2 is a circuit diagram of the voltage control module of the driving circuit of FIG. 1.
Figure 3:
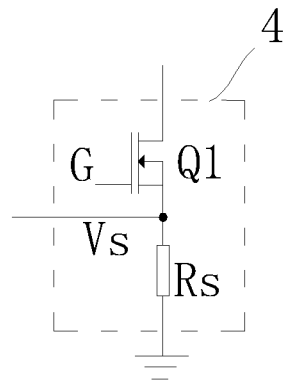
FIG. 3 is a circuit diagram of the feedback voltage module of the driving circuit of FIG. 1.
Figure 4:
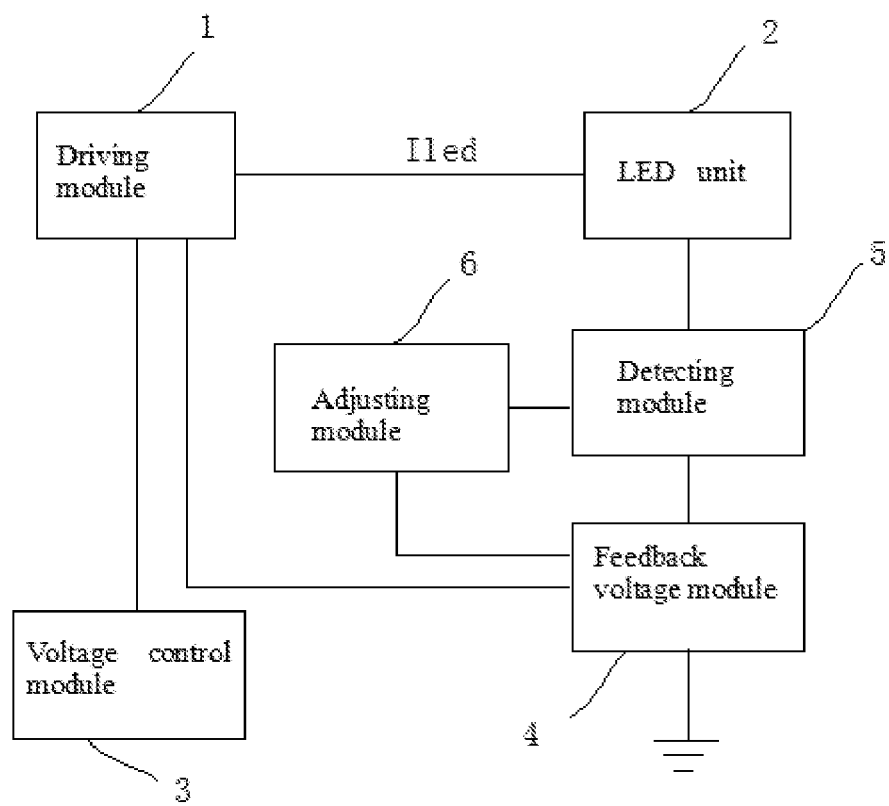
FIG. 4 is a connected module diagram of the LED backlight driving circuit in accordance with one embodiment.

FIG. 4 is a connected module diagram of the LED backlight driving circuit in accordance with one embodiment. The LED backlight driving circuit includes a driving module 1, a detecting module 5, and an adjusting module 6. The driving module 1 is for receiving the control voltage generated by the voltage control module 3 and the feedback voltage generated by the feedback voltage module 4 and for generating driving signals (Iled) to the LED unit 2. The detecting module 5 is for generating adjusting signals for the adjusting module 6 according to a detected value of the driving signals (Iled). The adjusting module 6 is for controlling the feedback voltage according to the adjusting signals generated by the detecting module 5 so as to adjust the driving signals (Iled).

One reference driving signals are configured within the detecting module 5. The reference driving signals relate to a predetermined driving signals of the driving circuit. The adjusting module 6 increases the feedback voltage according to a first adjusting signals when the detecting module 5 determines that the value of the driving signals (Iled) is smaller than the reference driving signals. The feedback voltage is increased until the driving signals (Iled) is equivalent to the reference driving signals. The adjusting module decreases the feedback voltage according to a second adjusting signals when the detecting module 5 determines that the value of the driving signals (Iled) is larger than the reference driving signals. The feedback voltage is decreased until the driving signals (Iled) is equivalent to the reference driving signals.

Figure 7:
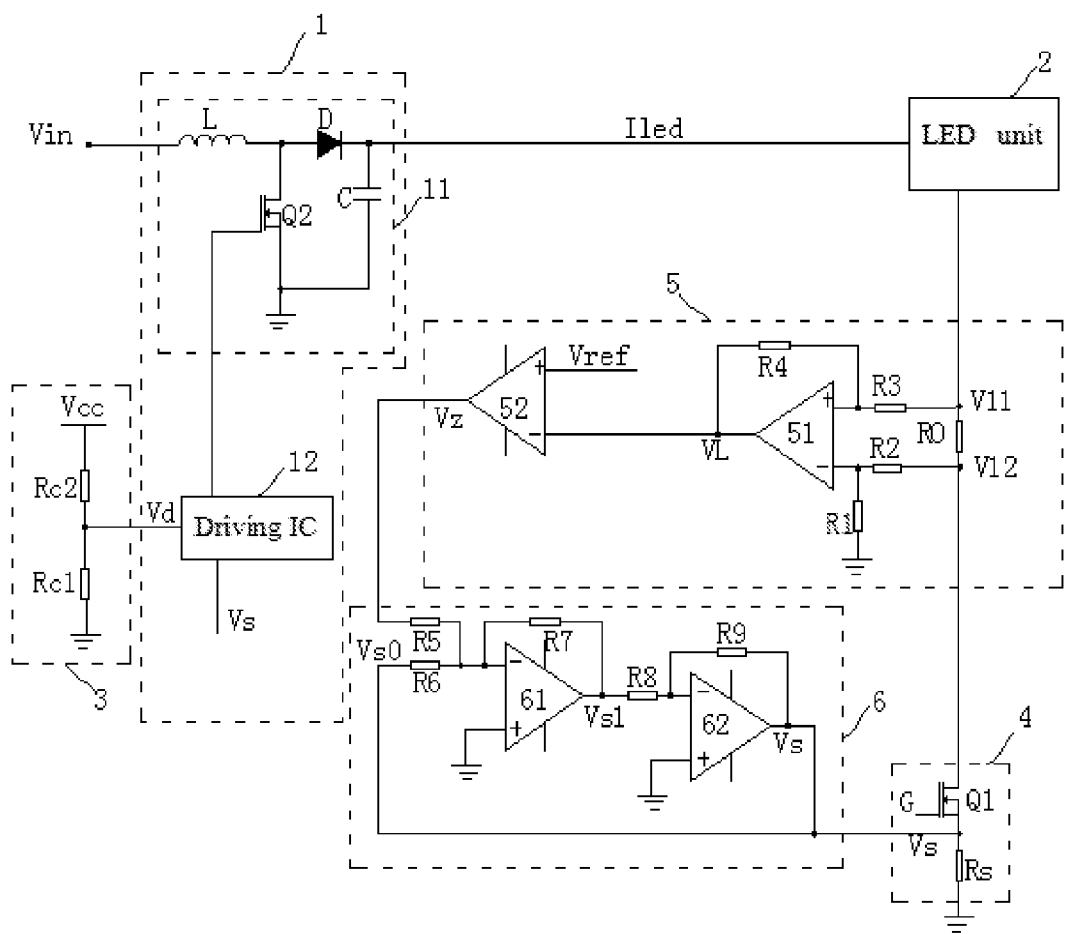
FIG. 7 is a circuit diagram of the driving circuit of FIG. 4.

FIG. 7 is a circuit diagram of the driving circuit of FIG. 4. As shown, the backlight driving circuit includes the driving module 1, the LED unit 2, the voltage control module 3, the feedback voltage module 4, the detecting module 5, and the adjusting module 6.

The driving module 1 includes a boost circuit 11 and a driving IC 12. The boost circuit 11 includes the inductor L, the rectifier diode D, the second MOS transistor Q2, and a capacitor C. One end of the inductor L receives the inputted input DC voltage (Vin), and the other end of the inductor L connects to a positive end of the rectifier diode D and to a drain of the second MOS transistor Q2. A gate of the second MOS transistor Q2 connects to the driving IC 12. The signals of the driving IC 12 turns on the second MOS transistor Q2 or turn off the second MOS transistor Q2. A source of the second MOS transistor Q2 is electrically grounded. A negative end of the rectifier diode D is electrically grounded via the capacitor C. The negative end of the rectifier diode D, which forms an output end of the boost circuit 11, connects to the LED unit 2. The driving IC 12 connects to the feedback voltage module 4 via a first pin for monitoring the change of the feedback voltage (Vs) generated by the feedback voltage module 4. At the same time, the driving IC 12 receives the control voltage (Vd) generated by the voltage control module 3 via a second pin. In addition, the driving IC 12 turns on or off the second MOS transistor Q2 via a third pin so as to control the boost circuit 11. As such, the boost circuit 11 is capable of converting the input DC voltage (Vin) to the driving signals (Iled) for the LED unit 2 and thus the LED unit 2 is driven a constant current.

The voltage control module 3 is for providing the control voltage (Vd) for the driving module 1. The voltage control module 3 includes a first resistance voltage divider (Rc1) and a second resistance voltage divider (Rc2). One end of the second resistance voltage divider (Rc2) connects the voltage (Vcc), and the other end of the second resistance voltage divider (Rc2) is electrically grounded via the first resistance voltage divider (Rc1). The control voltage (Vd) is pulled out between the first resistance voltage divider (Rc1) and the second resistance voltage divider (Rc2) to be inputted to the driving IC 12.

The feedback voltage module 4 is for providing the feedback voltage (Vs) to the driving module 1. The feedback voltage module 4 includes a first MOS transistor Q1 and the feedback resistor (Rs). The drain of the first MOS transistor Q1 connects to the negative end of the LED unit 2. The gate (G) of the first MOS transistor Q1 connects to the driving IC 12. The source of the first MOS transistor Q1 is electrically grounded via the feedback resistor (Rs). The feedback voltage (Vs) is pulled out between the resistor R2 and a connecting point of the first MOS transistor Q1 to be inputted to the driving IC 12. By monitoring the feedback voltage (Vs) of the feedback resistor (Rs), the current passing the feedback resistor (Rs) is obtained so as to obtain the driving signals (Iled) of the driving circuit.

Figure 5:
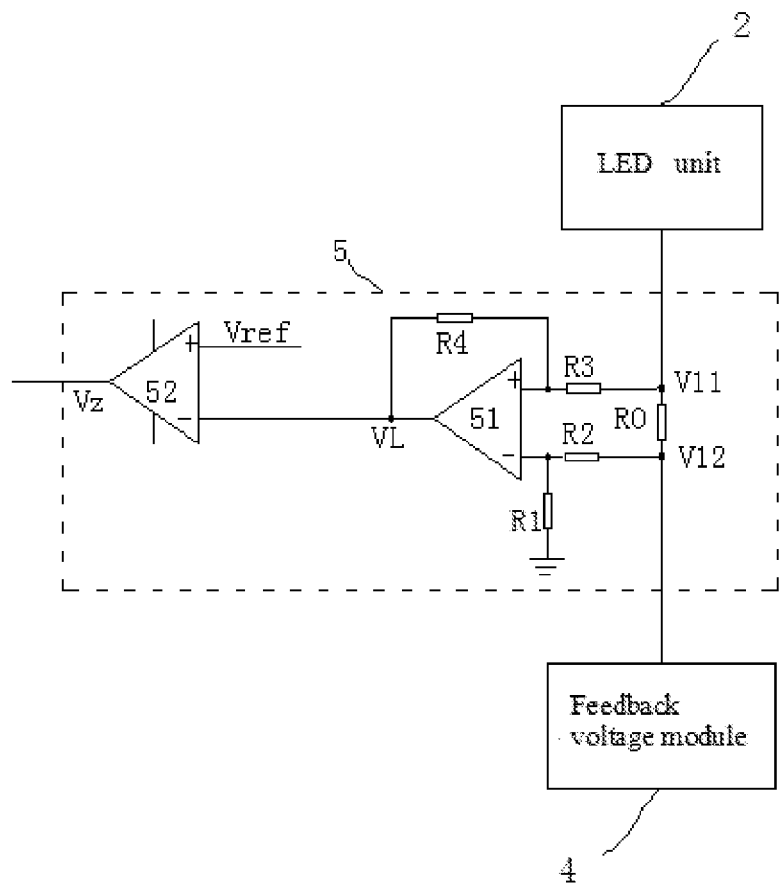
FIG. 5 is a circuit diagram of the detecting module of the driving circuit of FIG. 4.
Figure 6:
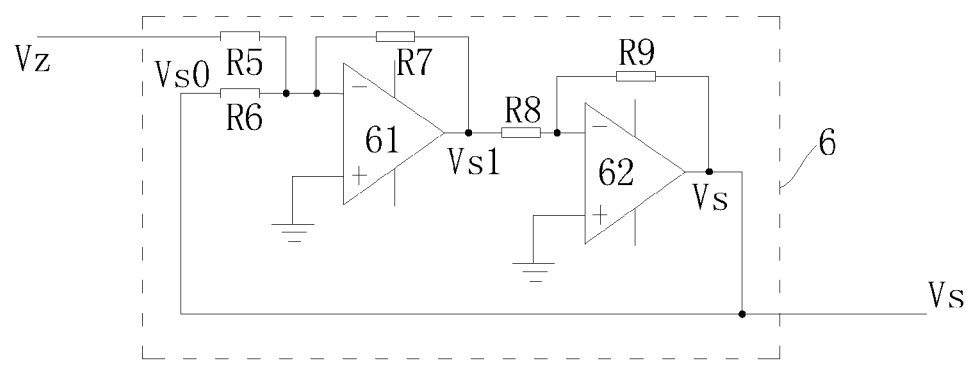
FIG. 6 is a circuit diagram of the adjusting module of the driving circuit of FIG. 4.

As stated above, the LED backlight driving circuit further includes the detecting module 5 and the adjusting module 6. The driving signals (Iled) is adjusted via the adjusting module 6 so as to enhance the precision of the driving signals (Iled). FIGS. 5 and 6 are circuit diagrams of the detecting module 5 and the adjusting module 6.

As shown in FIG. 5, the detecting module 5 is for detecting the value of the driving signals (Iled) and for generating adjusting signals (Vz) for the adjusting module 6. In order to detect the value of the driving signals (Iled), the detecting module 5 includes a precise resistor (RO), a first resistor (R1), a second resistor (R2), a third resistor (R3), a fourth resistor (R4), a first amplifier 51, and a comparator 52. The precise resistor (RO) is serially connected between the LED unit 2 and the ground. The negative end of the first amplifier 51 connects to the low potential end of the precise resistor (RO) via the second resistor (R2). In addition, the first resistor (R1) is provided between the negative end and the ground. The positive end of the first amplifier 51 connects to the high potential end of the precise resistor (RO) via the third resistor (R3). In addition, the fourth resistor (R4) is provided between the positive end of the first amplifier 51 and the output end. The output end of the first amplifier 51 inputs a first output signals (VL) to the negative end of the first comparator 52. The positive end of the first comparator 52 connects to the reference driving signals. The output end of the first comparator 52 inputs the adjusting signals (Vz) to the adjusting module 6. It is to be noted that the precise resistor (RO) relates to the resistor with the deviation under 0.5%.

As shown in FIG. 5, the detecting module 5 first detects the potential difference between two ends of the precise resistor (RO), and then compares with the reference driving signals so as to obtain the relationship between the driving signals (Iled) and the reference voltage (Vref). The circuit of the detecting module will be described hereinafter with selected parameters. The resistance of the precise resistor (RO) is 1Ω, and the resistance of the first resistor (R1), second resistor (R2), third resistor (R3), and fourth resistor (R4) are the same. The reference voltage (Vref) is the product of the predetermined driving signals (current) of the LED unit and the resistance of the precise resistor (RO). Thus, the voltage of the two ends of the precise resistor (RO) are respectively V11 and V12, and V11>V12. As such, the driving signals (Iled) and the first output signals (VL) satisfy the equations below:

$$Iled = (V11-V12)/RO = V11-V12;$$

$$VL = V11-V12;$$

When the value of the driving signals (Iled) is smaller than the reference driving signals, VL is smaller than the reference voltage (Vref), and the adjusting signals (Vz) outputted by the comparator 52 is larger than zero. When the value of the driving signals (Iled) is larger than the reference driving signals, VL is larger than the reference voltage (Vref), and the adjusting signals (Vz) outputted by the comparator 52 is smaller than zero.

In view of the above comparison result, when the adjusting signals (Vz) is larger than zero, the value of the driving signals (Iled) is smaller than the reference driving signals. At this moment, the value of the driving signals (Iled) has to be increased. When the adjusting signals (Vz) is smaller than zero, the value of the driving signals (Iled) is larger than the reference driving signals. At this moment, the value of the driving signals (Iled) has to be decreased. Thus, the adjusting module 6 further includes a calculating circuit with two input ends and one output end. One of the input end receives the adjusting signals (Vz), and the other input end receives the feedback voltage (Vs) generated by the feedback voltage module 4. The output end connects to the node of the feedback voltage of the feedback voltage module 4. The relationship between the signals of the output end and the two input ends satisfies the equation below:

$$Vs = A*Vz + Vs0;$$

Vs represents the voltage value of the signals of the output end, that is, the feedback voltage (Vs) generated by the feedback voltage module 4. Vz represents the voltage value of one of the input end, that is, the voltage value of the adjusting signals. Vs0 represents the voltage value of another input end, that is, the value of the feedback voltage recently generated by the feedback voltage module 4, and A is a constant number. As stated above, the driving signals (Iled) is equivalent to a ratio of feedback voltage (Vs) to the feedback resistor (Rs). By changing the value of the feedback voltage (Vs), the driving signals (Iled) may be adjusted.

Specifically, referring to FIG. 6, the adjusting module 6 includes a second amplifier 61, a third amplifier 62, a fifth resistor (R5), a sixth resistor (R6), a seventh resistor (R7), an eighth resistor (R8), and a ninth resistor (R9). The negative end of the second amplifier 61 receives the adjusting signals (Vz) provided by the detecting module 5 and the feedback voltage (Vs) provided by the feedback voltage module 4 respectively via the fifth resistor (R5) and the sixth resistor (R6). The positive end of the second amplifier 61 is electrically grounded. The output end (Vs1) of the second amplifier 61 connects to the negative end of the third amplifier 62 via the eighth resistor (R8). In addition, the seventh resistor (R7) is provided between the negative end and the output end of the second amplifier 61. The positive end of the third amplifier 62 is electrically grounded. The output end of the third amplifier 62 connects to the feedback voltage module 4. In addition, a ninth resistor (R9) is provided between the negative end and the output end of the second amplifier 61. The circuit of the adjusting module will be described hereinafter with selected parameters. The resistance of the sixth resistor (R6) and the seventh resistor (R7) are the same. The resistance of the eighth resistor (R8) and the ninth resistor (R9) are the same. The resistance of the fifth resistor (R5) is smaller than that of the seventh resistor (R7). The relationship between the signals of the output end and the two input ends satisfies the equation below:

$$Vs = (R7/R5)*Vz + Vs0$$

That is, the constant number "A" is the ratio of the resistance of the seventh resistor (R7) to that of the fifth resistor (R5).

The LED backlight driving circuit of FIG. 7 will be described hereinafter.

First, the adjusting signals (Vz) generated by the detecting module 5 is a positive value when the detecting module 5 detects that the voltage at two ends of the precise resistor (RO) is smaller than the reference voltage (Vref), that is, the value of the driving signals (Iled) is smaller than the reference driving signals. In view of the equation: Vs=(R7/R5)*Vz+Vs0, the feedback voltage (Vs) is continuously increased due to the adjustment of the adjusting module 6 such that the value of the driving signals (Iled) is increased. When the value of the driving signals (Iled) is increased until being equal to the reference driving signals, Vz equals to zero. At this moment, Vs equals to Vs0. That is, the feedback voltage (Vs) remains the same, and the driving circuit obtains the stable driving signals (Iled) equaling to the reference driving signals.

Second, the adjusting signals (Vz) generated by the detecting module 5 is a negative value when the detecting module 5 detects that the voltage at two ends of the precise resistor (RO) is larger than the reference voltage (Vref), that is, the value of the driving signals (Iled) is larger than the reference driving signals.

In view of the equation: Vs=(R7/R5)*Vz+Vs0, the feedback voltage (Vs) is continuously decreased due to the adjustment of the adjusting module 6 such that the value of the driving signals (Iled) is decreased. When the value of the driving signals (Iled) is decreased until being equal to the reference driving signals, Vz equals to zero. At this moment, Vs equals to Vs0. That is, the feedback voltage (Vs) remains the same, and the driving circuit obtains the stable driving signals (Iled) equaling to the reference driving signals.

In the embodiment, the LED unit 2 is the LED string having a plurality of LEDs serially connected.

In view of the above, the driving module receives the feedback voltage generated by the feedback voltage module to adjust the current within the LED unit. In addition, the current within the LED unit is also precisely adjusted by the detecting module and the adjusting module. Specifically, one reference driving signals is configured within the detecting module. When detecting the current within the LED unit is smaller than the reference driving signals, the first adjusting signals are generated. The adjusting module increases the feedback voltage according to the first adjusting signals so as to increase the current within the LED unit. When detecting the current within the LED unit is larger than the reference driving signals, the second adjusting signals are generated. The adjusting module decreases the feedback voltage according to the first adjusting signals so as to decrease the current within the LED unit. In this way, not only the current precision within the LED unit is enhanced, but also the light source is kept stable. Also, the life cycle of the LED units is also increased.

It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A LED backlight driving circuit, comprising:
   a driving module for receiving a control voltage generated by a voltage control module, receiving a feedback voltage generated by a feedback voltage module, and generating driving signals to a LED unit;
   a detecting module for generating adjusting signals for an adjusting module according to a detected value of the driving signals; and
   the adjusting module for controlling the feedback voltage according to the adjusting signals generated by the detecting module so as to adjust the driving signals;
   wherein one reference driving signals is configured within the detecting module, the adjusting module increases the feedback voltage according to a first adjusting signals when the detecting module determines that a value of the driving signals is smaller than the reference driving signals, and the adjusting module decreases the feedback voltage according to a second adjusting signals when the detecting module determines that the value of the driving signals is larger than the reference driving signals;
   wherein the detecting module comprises a precise resistor serially connected between the LED unit and ground, and the value of the driving signals of the circuit is obtained by detecting the driving signals of the precise resistor; and
   wherein the detecting module further comprises a first amplifier and a first comparator, a negative end of the first amplifier connects to a low potential end of the precise resistor via a second resistor, a first resistor is provided between a negative end and the ground, a positive end of the first amplifier connects to a high potential end of the precise resistor via a third resistor, a fourth resistor is provided between the positive end and an output end of the first amplifier, the output end of the first amplifier connects to a negative end of the first comparator, a positive end of the first comparator connects to the reference driving signals, and the output end of the first comparator outputs the adjusting signals.

2. The LED backlight driving circuit as claimed in claim 1, wherein the resistance of the first resistor, the second resistor, the third resistor, and the fourth resistor are the same.

3. The LED backlight driving circuit as claimed in claim 1, wherein the adjusting module comprises a calculating circuit having two input ends and one output end, one of the input end receives the adjusting signals, and the other input end receives the feedback voltage generated by the feedback voltage module, the output end connects to a feedback voltage node of the feedback voltage module, a relationship between the signals of the output end and the two input ends satisfies the equation: Vs=A*Vz+Vs0, wherein Vs represents a voltage value of the output end, which is the feedback voltage value generated by the feedback voltage module, Vz represents the voltage value of one of the input end, which is the voltage value of the adjusting signals, Vs0 represents the voltage value of another input end, which is the feedback voltage value recently generated by the feedback voltage module, and A is a constant number.

4. The LED backlight driving circuit as claimed in claim 1, wherein the adjusting module further comprises a second amplifier and a third amplifier, the negative end of the second amplifier receives the adjusting signals and the feedback voltage respectively via the fifth resistor, and the sixth resistor, the positive end of the second amplifier is electrically grounded, the output end of the second amplifier connects to the negative end of the third amplifier via the eighth resistor, a seventh resistor is provided between the negative end and the output end of the second amplifier, the positive end of the third amplifier is electrically grounded, the output end of the third amplifier connects to the feedback voltage node of the feedback voltage module, and a ninth resistor is provided between the negative end and the output end of the second amplifier.

5. The LED backlight driving circuit as claimed in claim 4, wherein the resistance of the sixth resistor and the seventh resistor are the same, and the resistance of the eighth resistor and the ninth resistor are the same, and the resistance of the fifth resistor is smaller than the resistance of the seventh resistor.

6. The LED backlight driving circuit as claimed in claim 4, wherein the driving module comprises a boost circuit and a driving IC, the boost circuit converts input voltage signals to the needed driving signals so as to provide the driving signals to the LED unit, the driving IC receives the control voltage and the feedback voltage to control the boost circuit such that the boost circuit is capable of converting the input voltage signals to the needed driving signals for the LED unit.

7. A liquid crystal display having a LED backlight source, a driving circuit of the LED backlight source comprising:
a driving module for receiving a control voltage generated by a voltage control module, receiving a feedback voltage generated by a feedback voltage module, and generating driving signals to a LED unit;
a detecting module for generating adjusting signals for an adjusting module according to a detected value of the driving signals; and
the adjusting module for controlling the feedback voltage according to the adjusting signals generated by the detecting module so as to adjust the driving signals;
wherein one reference driving signals is configured within the detecting module, the adjusting module increases the feedback voltage according to a first adjusting signals when the detecting module determines that a value of the driving signals is smaller than the reference driving signals, and the adjusting module decreases the feedback voltage according to a second adjusting signals when the detecting module determines that the value of the driving signals is larger than the reference driving signals;
wherein the detecting module comprises a precise resistor serially connected between the LED unit and ground, and the value of the driving signals of the circuit is obtained by detecting the driving signals of the precise resistor;
wherein the detecting module further comprises a first amplifier and a first comparator, a negative end of the first amplifier connects to a low potential end of the precise resistor via a second resistor, a first resistor is provided between a negative end and the ground, a positive end of the first amplifier connects to a high potential end of the precise resistor via a third resistor, a fourth resistor is provided between the positive end and an output end of the first amplifier, the output end of the first amplifier connects to a negative end of the first comparator, a positive end of the first comparator connects to the reference driving signals, and the output end of the first comparator outputs the adjusting signals.

8. The liquid crystal device as claimed in claim 7, wherein the resistance of the first resistor, the second resistor, the third resistor, and the fourth resistor are the same.

9. The liquid crystal device as claimed in claim 7, wherein the adjusting module comprises a calculating circuit having two input ends and one output end, one of the input end receives the adjusting signals, and the other input end receives the feedback voltage generated by the feedback voltage module, the output end connects to a feedback voltage node of the feedback voltage module, a relationship between the signals of the output end and the two input ends satisfies the equation: $Vs=A*Vz+Vs0$, wherein Vs represents a voltage value of the output end, which is the feedback voltage value generated by the feedback voltage module, Vz represents the voltage value of one of the input end, which is the voltage value of the adjusting signals, Vs0 represents the voltage value of another input end, which is the feedback voltage value recently generated by the feedback voltage module, and A is a constant number.

10. The liquid crystal device as claimed in claim 7, wherein the adjusting module further comprises a second amplifier and a third amplifier, the negative end of the second amplifier receives the adjusting signals and the feedback voltage respectively via the fifth resistor, and the sixth resistor, the positive end of the second amplifier is electrically grounded, the output end of the second amplifier connects to the negative end of the third amplifier via the eighth resistor, a seventh resistor is provided between the negative end and the output end of the second amplifier, the positive end of the third amplifier is electrically grounded, the output end of the third amplifier connects to the feedback voltage node of the feedback voltage module, and a ninth resistor is provided between the negative end and the output end of the second amplifier.

11. The liquid crystal device as claimed in claim 10, wherein the resistance of the sixth resistor and the seventh resistor are the same, and the resistance of the eighth resistor and the ninth resistor are the same, and the resistance of the fifth resistor is smaller than the resistance of the seventh resistor.

12. The liquid crystal device as claimed in claim 10, wherein the driving module comprises a boost circuit and a driving IC, the boost circuit converts input voltage signals to the needed driving signals so as to provide the driving signals to the LED unit, the driving IC receives the control voltage and the feedback voltage to control the boost circuit such that the boost circuit is capable of converting the input voltage signals to the needed driving signals for the LED unit.

* * * * *